(12) United States Patent
Yoon et al.

(10) Patent No.: US 10,241,711 B2
(45) Date of Patent: Mar. 26, 2019

(54) MULTIVERSIONED NONVOLATILE MEMORY HIERARCHY FOR PERSISTENT MEMORY

(71) Applicant: HEWLETT PACKARD ENTERPRISE DEVELOPMENT LP, Houston, TX (US)

(72) Inventors: Doe Hyun Yoon, Palo Alto, CA (US); Sheng Li, Palo Alto, CA (US); Jishen Zhao, Palo Alto, CA (US); Norman P. Jouppi, Palo Alto, CA (US)

(73) Assignee: HEWLETT-PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/774,521

(22) PCT Filed: Mar. 14, 2013

(86) PCT No.: PCT/US2013/031600
§ 371 (c)(1),
(2) Date: Sep. 10, 2015

(87) PCT Pub. No.: WO2014/142908
PCT Pub. Date: Sep. 18, 2014

(65) Prior Publication Data
US 2016/0034225 A1 Feb. 4, 2016

(51) Int. Cl.
*G06F 12/00* (2006.01)
*G06F 3/06* (2006.01)
(Continued)

(52) U.S. Cl.
CPC .......... *G06F 3/0647* (2013.01); *G06F 3/0619* (2013.01); *G06F 3/0685* (2013.01);
(Continued)

(58) Field of Classification Search
None
See application file for complete search history.

(56) References Cited

U.S. PATENT DOCUMENTS

| 5,732,238 A | 3/1998 | Sarkozy |
| 6,463,513 B1 | 10/2002 | Bish et al. |

(Continued)

FOREIGN PATENT DOCUMENTS

| CN | 102364464 | 2/2012 |
| EP | 1510924 | 3/2005 |
| KR | 1020110076345 | 7/2011 |

OTHER PUBLICATIONS

Bhandari, K. et al., Implications of CPU Caching on Byte-addressable Non-volatile Memory Programming, (Research Paper), Dec. 6, 2012, 7 Pages.
(Continued)

*Primary Examiner* — Daniel D Tsui
(74) *Attorney, Agent, or Firm* — Hewlett Packard Enterprise Patent Department

(57) ABSTRACT

Example methods and systems to provide persistent memory are disclosed herein. An example system includes a nonvolatile cache to store data received from a volatile cache. The data is associated with a transaction and the data is to be identified as durable when the transaction is committed. The example system includes a nonvolatile memory to store the data received from the nonvolatile cache when the data is identified as durable.

15 Claims, 7 Drawing Sheets

(51) Int. Cl.
*G06F 12/0868* (2016.01)
*G06F 12/0897* (2016.01)
*G06F 9/46* (2006.01)
*G06F 12/0804* (2016.01)
*G06F 12/0815* (2016.01)

(52) U.S. Cl.
CPC .......... *G06F 9/467* (2013.01); *G06F 12/0804* (2013.01); *G06F 12/0868* (2013.01); *G06F 12/0897* (2013.01); *G06F 9/466* (2013.01); *G06F 12/0815* (2013.01); *G06F 2212/1016* (2013.01); *G06F 2212/1032* (2013.01); *G06F 2212/225* (2013.01); *G06F 2212/604* (2013.01); *Y02D 10/13* (2018.01)

(56) References Cited

U.S. PATENT DOCUMENTS

| | | | |
|---|---|---|---|
| 6,725,342 | B1 | 4/2004 | Coulson |
| 7,761,664 | B2 | 7/2010 | Gill |
| 2002/0174444 | A1 | 11/2002 | Gatto et al. |
| 2004/0064635 | A1 | 4/2004 | Jung et al. |
| 2004/0162950 | A1 | 8/2004 | Coulson |
| 2007/0011416 | A1 | 1/2007 | Lee |
| 2007/0294474 | A1 | 12/2007 | Panabaker et al. |
| 2010/0057984 | A1 | 3/2010 | Chen et al. |
| 2010/0153646 | A1 | 6/2010 | Chen et al. |
| 2010/0180065 | A1* | 7/2010 | Cherian .............. G06F 12/0804 711/103 |
| 2010/0293337 | A1 | 11/2010 | Murphy et al. |
| 2012/0297147 | A1* | 11/2012 | Mylly ................ G06F 12/0246 711/143 |
| 2013/0054869 | A1 | 2/2013 | Tolia et al. |

OTHER PUBLICATIONS

Coburn, Joel et al, NV-Heaps: Making Persistent Objects Fast and Safe with Next-Generation, Non-Volatile Memories, Proceedings of ASPLOS'11, Mar. 2011, 13 Pages.

Lee, Eunji et al, Unioning of the Buffer Cache and Journaiing Layers with Non-Volatile Memory, 11th UNSENIX Conf on Fiie & Storage Technoiogies (FAST'13), Feb. 2013, pp. 73-80.

Moraru, I. et al., Persistent, Protected and Cached: Building Blocks for Main Memory Data Stores, (Research Paper), Dec. 2011, 24 Pages.

PCT Search Report/Written Opinion ~ Application No. PCT/US2013/031600 dated Dec. 19, 2013 ~ 11 pages.

Venkataraman, S et al~"Consistent and Durable Data Structures for Non-Volatile Byte-Addressable Memory" ~ Proceedings of FAST'11~Feb. 2011~15 Pages.

Extended European Search Report dated Jan. 3, 2017 for EP Application No. 13877967.3; pp. 25.

Michael Okun et al, Atomic Writes for Data Integrity and Consistency in Shared Storage Devices for Clusters, Institute of Computer Science, The Hebrew University of Jerusalem, Jerusalem 91904, Israel, 2002 IEEE, 7 Pgs.

Volos et al., "Mnemosyne: Lightweight persistent memory," in ASPLOS, 2011, pp. 91-104.

Condit et al., "Better I/O through byte-addressable, persistent memory," in SOSP, 2009, pp. 133-146.

* cited by examiner

MULTIVERSIONED NONVOLATILE MEMORY HIERARCHY FOR PERSISTENT MEMORY

BACKGROUND

Persistent memories store data over long durations. Data may be referred to as persistent data when that data is maintained or preserved in an unchanged state such that it can be recalled or retrieved in the same state at a later time. Often, persistent data is created and stored by one process, and subsequently retrieved by another process at a later time.

DETAILED DESCRIPTION

Figure 1A:
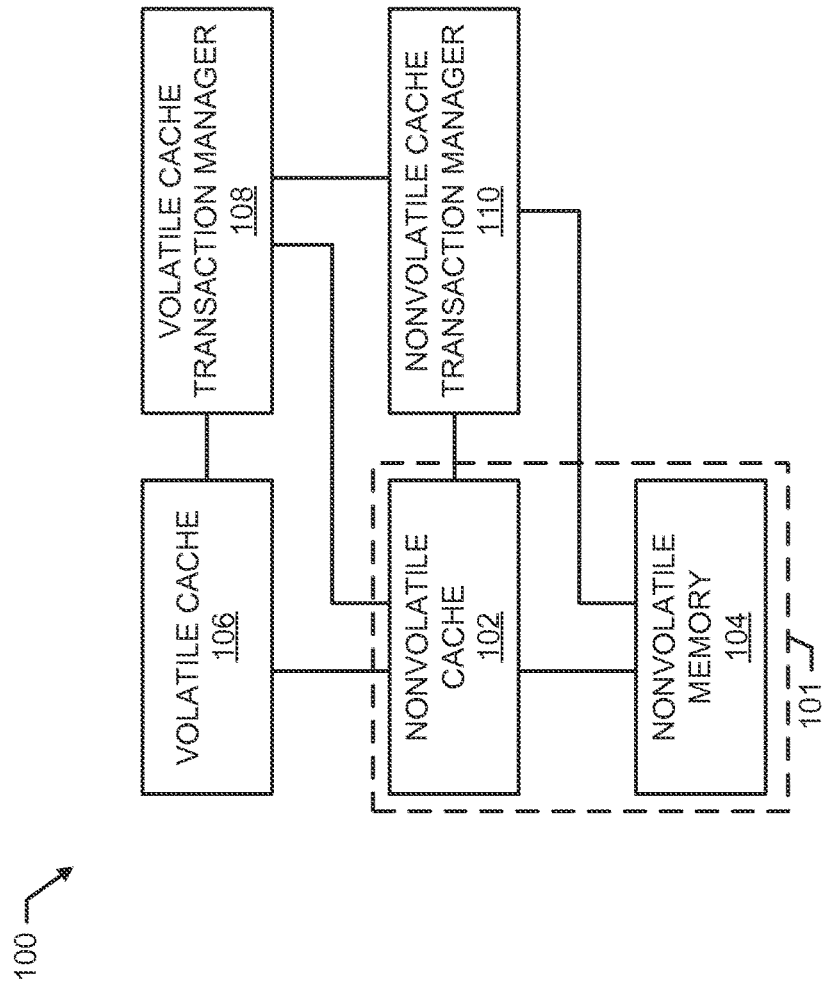
FIG. 1A illustrates an example persistent memory region including an example nonvolatile cache and an example nonvolatile memory to provide persistent memory.

Nonvolatile memories store and retain (e.g., persist) data without applied power. Some nonvolatile memories allow read and/or write operations to be performed at a fine granularity (e.g., one byte). Due to increased density and scalability characteristics, and the capability to persist data without applied power, some nonvolatile memory technologies (e.g., byte-addressable nonvolatile memories such as phase-change memory, spin-transfer torque memory, memristors, etc.) are preferred over volatile memories such as dynamic random-access memory (DRAM) for use as main memory. Byte-addressable nonvolatile memories may be used to implement persistent storage that maintains states of in-memory data objects even after application and/or system failures.

During a data update process in a nonvolatile memory, a failure, a memory leak, and/or an application error that interrupts the update process may corrupt data in the nonvolatile memory. Examples disclosed herein enable nonvolatile memory systems to perform safe data updates so that data integrity and consistency is maintained during normal operating conditions and when system and/or application failures occur. Examples disclosed herein enable maintaining data integrity and consistency in nonvolatile memories by providing a multiversioned nonvolatile memory hierarchy to perform atomic, consistent, and durable data updates to nonvolatile persistent data structures.

An atomic data update is one in which all data updates of a particular update request or process are completely performed such that none of the data updates is left partially incomplete. An example of a partially incomplete data update to a data structure is when a node of the data structure is deallocated (e.g., the node is no longer deemed as storing valid data), but another node still points to the deallocated node. A data update provides consistency across data in a data structure when it updates data in one or more nodes of the data structure such that meaningful relationships and ordering between data nodes is maintained so that the data structure remains in a valid, useable state. In some examples, if consistency is not achieved, out of order data updates may result in inconsistent states that may lead to invalid, unusable, and unrecoverable data structures. As used herein, data that is consistent and that can survive system failures, power loss, and/or intentional/unintentional system shutdown events, is referred to as durable data. To achieve durability, data is written through to long-term storage (e.g., nonvolatile memory) where it is persisted over a long duration. In some instances, users request that a result of a data update should become durable as soon as the update is finished. In such instances, results of data updates are evicted to nonvolatile memory immediately or as soon as possible. In this manner, data can be made durable so that it is available for retrieval after recovering from a system failure and/or power loss should such an event occur. In some prior techniques, achieving durability increases off-chip traffic and/or prevents out of order operation scheduling.

In a memory management system, a transaction is used to update data, to facilitate recovery from failures, and to enable data to be consistent in an event of a system failure. A transaction is an individual and indivisible operation or set of operations that must all be performed completely or none at all. A transaction may include, for example, reading a number of cache lines, updating data read from the cache lines, and writing the updated data to the cache lines. In such a transaction, all of the reading, updating, and writing must be completed for the transaction to be successfully completed. In some examples, software interfaces are used to implement transactions. Other interfaces may additionally or alternatively be used to implement transactions.

Cache systems use multiple types of transaction states. Example types of transaction states are referred to as an uncommitted transaction, a committing transaction, and a committed transaction. After data is assigned to a transaction, but before the transaction begins (e.g., to update the data or write to the data), the transaction is referred to as an uncommitted transaction. While the transaction is executing (e.g., while the transaction is reading data from a cache line and/or writing data to a cache line), the transaction is referred to as a committing transaction. When a committing transaction is updating/writing data to a nonvolatile memory, and before the committing transaction finishes updating/writing the data (e.g., an indivisible set of data associated with a transaction is only partially updated until the committing transaction finishes updating/writing all of the indivisible set of data), any portion of the data that the committing transaction has written to the nonvolatile memory is referred to as persistent data. When the transaction is done executing, it is referred to as a committed transaction. Once the transaction is done executing (e.g., the transaction is a committed transaction) and the data (e.g., a set of data associated with the transaction) updated by the transaction is stored in nonvolatile memory, the data is referred to as durable. Thus, data is durable if the data is persistent in nonvolatile memory and the transaction associated with the data is a committed transaction.

Some prior technologies employ software-based multiversioned data structures, redo or undo logging, write-ahead logging, or shadow paging to provide consistent data updates in nonvolatile memories. However, such technologies incur increased overhead in terms of performance and power. For example, write-ahead logging involves writing logs of persistent data updates to main memory (e.g., off-chip nonvolatile memory) to provide atomicity and durability. Such data traffic may incur long latencies and increase bandwidth demand at the memory bus. Latency and/or bandwidth issues may lead to system throughput degradation.

In some prior systems, a persistent memory region consists of only nonvolatile main memory such that data is not referred to as persistent until it is written through from a cache to the nonvolatile main memory. Example systems and methods disclosed herein provide a persistent memory architecture that enlarges or extends the persistent memory region to include a nonvolatile cache and nonvolatile main memory. Accordingly, examples disclosed herein enable persisting data as soon as it is stored in the nonvolatile cache, rather than waiting until it is stored in nonvolatile main memory. Example systems and methods disclosed herein reduce memory latency and/or data traffic relative to prior log-based persistency techniques. In addition, example systems and methods disclosed herein enable persisting data automatically while updating in-memory data stored in nonvolatile memory. Thus, example systems and methods disclosed herein improve system throughput and reduce memory power consumption by avoiding extensive data movement often associated with prior log-based techniques.

In prior memory systems, boundaries between volatile and nonvolatile storage are relatively clear. That is, volatile storage includes caches (which may be directly addressed and hardware controlled), and nonvolatile storage includes hard disk drives and solid-state drives (which may be block oriented and accessed through software interfaces such as file read, file write, etc.). For systems in which software controls data movement between a volatile domain (e.g., volatile memory) and a nonvolatile domain (e.g., a hard disk), programmers write failsafe software or firmware features to prevent old (e.g., valid and consistent) data from being corrupted by new data or uncommitted transactions.

However, with some byte-addressable nonvolatile memory systems, boundaries to be implemented between volatile and nonvolatile storage are less clear. Dirty data (e.g., data that has been changed) may be first stored in a cache hierarchy and subsequently evicted to lower levels of memory to eventually be stored in a nonvolatile memory. However, software is not always able to control when dirty data is written through to the nonvolatile memory. For example, dirty data associated with an uncommitted transaction may be prematurely evicted to the nonvolatile memory, which may result in corrupt data integrity if a transaction and/or system failure occurs before data consistency can be re-established during a write-through or data update. In some examples, results of committed transactions may remain in the volatile cache hierarchy after the transaction is committed. Software may then individually flush each cache line to force evictions of dirty data to be written through to nonvolatile memory. However, such software intervention is inefficient.

Software-based support for atomicity, consistency, and/or durability is acceptable for prior nonvolatile storage such as hard disk drives because magnetic hard disk drives are generally slow. Hence, software operations generally do not degrade performance, because such software is not usually slower than magnetic hard disk drives. However, recent emerging nonvolatile memory technologies such as solid state memories (e.g., phase-change memory (PCM), spin-transfer torque memory (STT-RAM), memristors, etc.) operate faster relative to electro-mechanical nonvolatile storage such as magnetic hard drives. As such, software-based processes to implement atomicity, consistency, and/or durability negatively impact performance of memory systems having solid state nonvolatile memory technologies.

Example systems and methods disclosed herein use hardware-based multiversioning to provide atomicity, consistency, and/or durability. Example systems and methods disclosed herein provide nonvolatile memory technologies that may also be used to implement multiversioned memories that, for example, preserve previous versions of data when the data is modified. Example systems and methods disclosed herein enable maintaining multiple versions of data (e.g., at a cache line granularity) using a nonvolatile memory hierarchy. Example systems and methods disclosed herein provide a persistent memory architecture that implements a persistent memory region using nonvolatile caches and nonvolatile main memory. Thus, example systems and methods disclosed herein enable data to be made persistent as soon as the data is written to the nonvolatile caches. Accordingly, example systems and methods disclosed herein reduce memory latency and/or traffic related to persisting data relative to prior log-based techniques used to ensure data persistency. Example systems and methods disclosed herein maintain persistent data without needing to maintain a log. Example logless data persistence techniques disclosed herein increase system throughput and reduce memory power consumption relative to prior systems by avoiding large amounts of data movement often used in log-based techniques.

FIG. 1A illustrates an example system 100 including a persistent memory region 101 comprising an example nonvolatile cache 102 and an example nonvolatile memory 104. The example nonvolatile cache 102 stores data received from a volatile cache 106. Examples disclosed herein use the persistent memory region 101 to implement a multiversioned persistent memory that enables storing one version of a persistent data structure in the example nonvolatile cache 102 and another version of the persistent data structure in the example nonvolatile memory 104. Although one level of nonvolatile cache (e.g., the nonvolatile cache 102) is shown, in some examples, more levels of nonvolatile cache may be provided in the persistent memory region 101 to store additional versions of persistent data. In some examples, each level of nonvolatile cache provided in the persistent memory region 101 may store additional versions of persistent data.

The example system 100 of FIG. 1A is logless because the example system 100 does not require additional operations for logging to enable persistent memory. To enable persistent memory, the example system 100 of FIG. 1A sends data associated with a committing transaction (e.g., a transaction that is executing) from the example volatile cache 106 to the example nonvolatile cache 102. Once the data is written to the example nonvolatile cache 102, the data is persistent.

Once all data associated with the committing transaction is written to the example nonvolatile cache 102, and the transaction becomes a committed transaction (e.g., the transaction is done executing), the data is durable and is available for retrieval after recovery from a system or power failure.

In the illustrated example, while a committing transaction is updating data in the volatile cache 106, the example system 100 forces dirty data (e.g., dirty cache lines) to be written back (e.g., a write through) from the example volatile cache 106 to the example nonvolatile cache 102 before the committing transaction is completed (e.g., before all of the data associated with the committing transaction is updated in the volatile cache 106). Prior systems wait until a committing transaction is finished updating all of its associated data in the volatile cache before writing the data back to nonvolatile memory from the volatile cache. Unlike such prior systems, examples disclosed herein allow data to be written back to the example nonvolatile cache 102 before a transaction ends. For example, a dirty cache line associated with a committing transaction may be written back to the nonvolatile cache 102 while the committing transaction is still executing (e.g., while the transaction is updating another associated cache line).

During write back operations, the state of the data being written back to the nonvolatile cache 102 is deemed persistent after a corresponding write back operation is complete. By keeping a status of the data as non-persistent until the write back is complete, a previous version of data stored in the nonvolatile memory 104 is maintained as a consistent version that can be recovered if the write back operation fails. For example, if the example system 100 fails while writing the dirty data to the example nonvolatile cache 102, the dirty data will be lost (e.g., the system failure will lead to losing contents of the volatile cache 106). However, the example system 100 may rollback to a previous consistent data version (e.g., a most recent consistent version) of the lost dirty data using a corresponding durable data copy stored in the example nonvolatile memory 104.

In the illustrated example, write back operations are used to implement logless persistent memory management. Write back operations involve evicting dirty data from the example volatile cache 106, and writing back the evicted dirty data to the example nonvolatile cache 102. In the illustrated example, when a transaction is being executed (e.g., the transaction is a committing transaction), an operation (e.g., a clean-on-commit operation) is implemented by an example volatile cache transaction manager 108 to facilitate write backs of data associated with the committing transaction from the example volatile cache 106 to the example nonvolatile cache 102.

Once all of the data associated with the committing transaction is stored at the example nonvolatile cache 102 and the transaction becomes a committed transaction (e.g., the transaction is done executing), an example nonvolatile cache transaction manager 110 marks the data as durable. In some examples, data may be evicted from the example nonvolatile cache 102 to the example nonvolatile memory 104 as part of a dirty line eviction process (e.g., in a dirty line eviction process similar to dirty line evictions from a known volatile cache to a known volatile main memory). In some examples, the example nonvolatile cache transaction manager 110 instructs the example nonvolatile cache 102 to evict data to the example nonvolatile memory 104 once the data is durable (e.g., once all data associated with a transaction is persistent and the transaction becomes a committed transaction).

In the illustrated example, the example volatile cache transaction manager 108 tracks states of transactions (e.g., determines when transactions are committing and when committing transactions become committed transactions) to control persistent memory updates. In the illustrated example, when the example volatile cache transaction manager 108 determines that a transaction is executing (e.g., the transaction is a committing transaction), the example volatile cache transaction manager 108 initiates write backs of data from the volatile cache 106 to the nonvolatile cache 102. Once data is written (e.g., after a write back operation of a committing transaction) to the nonvolatile cache 102, the data is persistent while the transaction is not yet a committed transaction. Once a transaction is done executing (e.g., the transaction becomes a committed transaction), the example volatile cache transaction manager 108 notifies the example nonvolatile cache transaction manager 110 that the transaction is a committed transaction.

In the illustrated example, when all data associated with a transaction is stored at the nonvolatile cache 102 (e.g., the data is persistent) and the transaction is a committed transaction, the example nonvolatile cache transaction manager 110 changes the status of the data from persistent to durable (e.g., marks the data as durable). Once all data associated with a committed transaction is stored in the example nonvolatile cache 102, the data is durable and is available for retrieval after recovery from a system or power failure.

In some examples, data may be evicted from the example nonvolatile cache 102 to the example nonvolatile memory 104 as part of a dirty line eviction process. In some examples, the example nonvolatile cache transaction manager 110 manages data at the example nonvolatile cache 102, and controls evictions of data to the example nonvolatile memory 104. For example, the example nonvolatile cache transaction manager 110 may initiate write backs of the durable data from the nonvolatile cache 102 to the nonvolatile memory 104.

The system 100 of the illustrated example provides improved recovery from system failures when compared to log-based mechanisms of prior systems. Some log-based mechanisms for system recovery require a system to locate where logs are stored and to find relevant log entries (e.g., log entries to be replayed and incomplete log entries of unfinished transactions due to system/application failures). These log entries may be identified by comparing flags (e.g., durable or commit flags). After identifying log entries to be replayed, the log-based system will first delete the incomplete log entries and then handle the log entries to be replayed. The log-based system copies data values from the log entries and restores them in appropriate memory locations based on addresses in the log entries so the system may rollback (e.g., with an undo log operation) or roll forward (e.g., with a redo log operation) to a consistent state. System recovery using such log-based mechanisms of prior systems is a lengthy process.

In the illustrated example, after a system failure and/or interruption, the example nonvolatile cache transaction manager 110 scans the example nonvolatile cache 102 and invalidates data associated with uncommitted transactions (e.g., data that is not durable). In some examples, a separate controller and/or manager may be provided to implement the system recovery. Previous versions of the data stored at the example nonvolatile cache 102 that have been marked as durable by the example nonvolatile cache transaction manager 110 and/or previous versions of the data that have been stored in the example nonvolatile memory 104 may be used directly to replace invalidated data at the example nonvolatile cache 102 when the example system 100 reboots. In some examples, the system recovery may be implemented using hardware. In some examples, the system recovery is implemented using a processor that has been provided with firmware and/or software to execute system recovery.

Figure 1B:
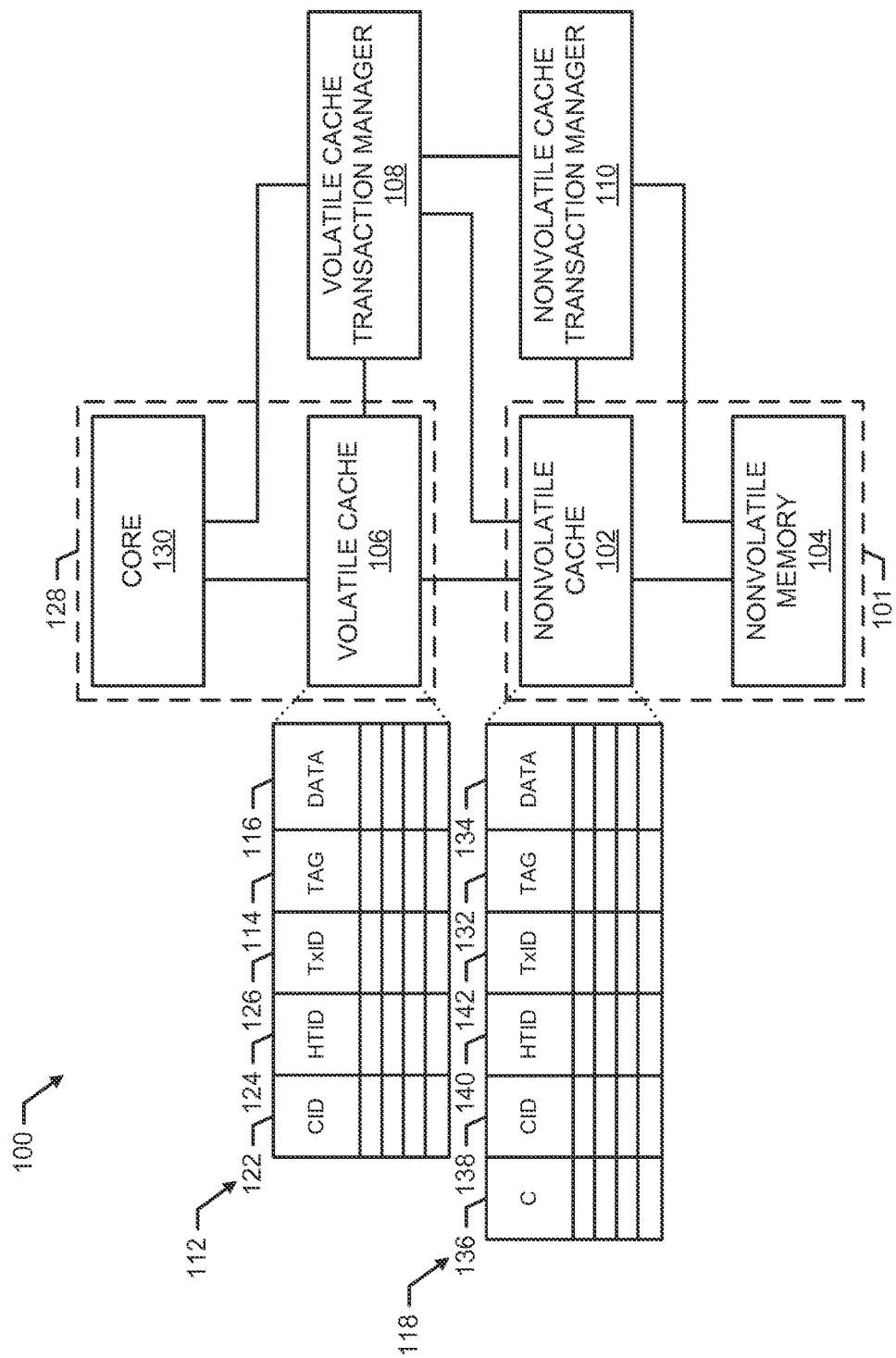
FIG. 1B shows the example persistent memory region of FIG. 1A in an example processor system to provide a multiversioned nonvolatile memory hierarchy for atomic, consistent, and durable data updates to persistent data structures.

FIG. 1B shows the example persistent memory region 101 of FIG. 1A in another example of the example processor system 100 to provide a multiversioned nonvolatile memory hierarchy to provide atomic, consistent, and durable data updates to persistent data structures. The example of FIG. 1B includes the example nonvolatile cache 102, the example nonvolatile memory 104, the example volatile cache 106, the example volatile cache transaction manager 108, and the example nonvolatile cache transaction manager 110 of FIG. 1A. In some examples, the example nonvolatile memory 104 is a part of main memory and may be in communication with a memory bus with volatile memory modules (e.g., including DRAM) (not shown). In the example of FIG. 1B, an example core 130 and the volatile cache 106 are part of an example processor 128. Although not shown, in some examples, the example processor 128 may also include the nonvolatile cache 102. The example nonvolatile cache 102, the example nonvolatile memory 104, the example volatile cache 106, the example volatile cache transaction manager 108, the example nonvolatile cache transaction manager 110, the example core 130, and/or the example processor 128 may be implemented using any physical implementation. For example, the nonvolatile cache 102 and the nonvolatile memory 104 may be packaged in a single package. In some examples, the nonvolatile cache 102 may be stacked on top of the processor 128 (e.g., a CPU die). In some examples, the nonvolatile memory 104 may be implemented off-chip (e.g., using dual in-line memory modules (DIMMs)). In yet other examples, one or more of the example nonvolatile cache 102, the example nonvolatile memory 104, the example volatile cache transaction manager 108, the example nonvolatile cache transaction manager 110, and/or the example processor 128 may be implemented as a separate device mounted on a printed circuit board (PCB).

In the illustrated example, as a transaction is executing (e.g., the transaction is a committing transaction), the example volatile cache transaction manager 108 manages write backs of dirty data (e.g., dirty cache lines) from the example volatile cache 106 to the example nonvolatile cache 102 using multiple write back operations of the committing transaction. During such write back operations, the state of the data being written back to the nonvolatile cache 102 is deemed persistent after a corresponding write back operation is complete. After the write back of the data to the nonvolatile cache 102 is completed, the state of the data stored at the example nonvolatile cache 102 is deemed persistent. Once all of the data associated with the committing transaction is stored at the example nonvolatile cache 102, the transaction becomes a committed transaction (e.g., the transaction is done executing), and the example nonvolatile cache transaction manager 110 marks the written back data as durable. In some examples, data (e.g., durable data) may be evicted from the example nonvolatile cache 102 to the example nonvolatile memory 104 as part of a dirty line eviction process. In some examples, the example nonvolatile cache transaction manager 110 instructs the example nonvolatile cache 102 to evict data to the example nonvolatile memory 104 when the data is marked as durable (e.g., when all data associated with a transaction is persistent and the transaction becomes a committed transaction).

In the illustrated example, the volatile cache 106 stores (or caches) data in an example volatile cache data structure 112. In the illustrated example, the volatile cache transaction manager 108 uses the volatile cache data structure 112 to track transactions (e.g., whether the transaction is uncommitted, committing, or committed) that update data in the volatile cache 106 to determine when such data is to be written back to the example nonvolatile cache 102. In the illustrated example, the example data structure 112 includes example tag fields 114, example data fields 116, example core identifier (CID) fields 122, example hardware thread identifier (HTID) fields 124, and example transaction identifier (TxID) fields 126.

The example tag field 114 is used to track data associations for data stored in the example data field 116 of the data structure 112. The example data field 116 represents a cache line or a portion of a cache line that stores data in the volatile cache 106. The example core identifier (CID) field 122 stores an identifier of a core (e.g., the core 130) that performs a transaction corresponding to a particular entry of the data structure 112. For example, the core 130 may initiate a transaction, and data associated with the transaction may be stored in the example data field 116. The example hardware thread identifier (HTID) field 124 identifies a hardware thread that a core (e.g., the core 130) uses to perform a transaction. The example transaction identifier (TxID) field 126 identifies a transaction when the example data field 116 stores data associated with a transaction (e.g., the data is unchanged or not dirty). When the transaction identifier 126 is set to zero (0), the data field 116 stores data not associated with the transaction. In some examples, the tag field 114, the data field 116, the CID field 122, the HTID field 124, and/or the TxID field 126 are initialized to zero (0). In some examples, the example data structure 112 has more or fewer fields.

In the illustrated example, the example nonvolatile cache 102 stores (or caches) data in an example nonvolatile cache data structure 118 that includes fields to track states of data stored in the example nonvolatile cache 102. In the illustrated example, the nonvolatile cache transaction manager 110 uses the states of the data to determine when such data is to be written back to the example nonvolatile memory 104. In the illustrated example, the example data structure 118 includes example tag fields 132, example data fields 134, example committing state (C) fields 136, example core identifier (CID) fields 138, example hardware thread identifier (HTID) fields 140, and example transaction identifier (TxID) fields 142.

The example tag field 132 is used to track data associations for data stored in the example data field 134 of the data structure 118. The example data field 134 represents a cache line or a portion of a cache line that stores data in the nonvolatile cache 102. The example committing state (C) field 136 identifies whether the data (e.g., stored in the data field 134) is associated with a committing or committed transaction. The example core identifier (CID) field 138 stores an identifier of a core (e.g., a core 130) that performs a transaction corresponding to a particular entry of the data structure 118. For example, the core 130 may initiate a transaction, and data associated with the transaction may be stored in the example data field 134. The example hardware thread identifier (HTID) field 140 identifies a hardware thread that a core (e.g., the core 130) uses to perform a transaction. The example transaction identifier (TxID) field 142 identifies a transaction when the example data field 134 stores data associated with a transaction (e.g., the data is unchanged or not dirty). When the transaction identifier 142 is set to zero (0), the data field 116 stores data not associated with the transaction. In some examples, the tag fields 132, the data fields 134, the C fields 136, the CID fields 138, the HTID fields 140, and/or the TxID fields 142 are initialized to zero (0). In some examples, the example data structure 118 has more or fewer fields.

In the illustrated example, the core 130 performs a transaction to cache data at the example volatile cache 106 (e.g., the core 130 updates and stores data in the data fields 116 of the example data structure 112). The example volatile cache transaction manager 108 tracks the transaction performed by the example core 130. For example, the example volatile cache transaction manager 108 assigns the transaction an identifier, and stores the identifier in a corresponding transaction identifier field 126. In addition, the volatile cache transaction manager 108 stores an identifier of the core 130 at a corresponding CID field 122, and stores an identifier of the hardware thread associated with the core 130 at the HTID field 124. When the transaction begins executing, the example volatile cache transaction manager 108 performs an operation (e.g., a clean-on-commit operation) to cause the volatile cache 106 to write back data associated with the transaction to the example nonvolatile cache 102.

As data associated with the transaction is written back to the example nonvolatile cache 102, the data is cached in a corresponding data field 134 of the data structure 118. A corresponding example committing state (C) field 136 is set to zero (0) by the example nonvolatile cache transaction manager 110 as the data is written back to the nonvolatile cache 102, because the data is associated with a committing transaction. When the transaction is done executing (e.g., the transaction becomes a committed transaction), the example nonvolatile cache transaction manager 110 updates the committing state (C) field 136 to one (1) because the data is associated with a committed transaction. Once all data associated with the transaction (e.g., a transaction identified at a corresponding TxID field 142) is cached at the example nonvolatile cache 102, and when a corresponding committing state (C) field 136 for all the data associated with the transaction is updated to one (1), the data is durable. In some examples, data may be evicted from the example nonvolatile cache 102 to the example nonvolatile memory 104 as part of a dirty line eviction process. In some examples, the example nonvolatile cache transaction manager 110 causes the example nonvolatile cache 102 to write back the data to the example nonvolatile memory 104.

Figure 2:
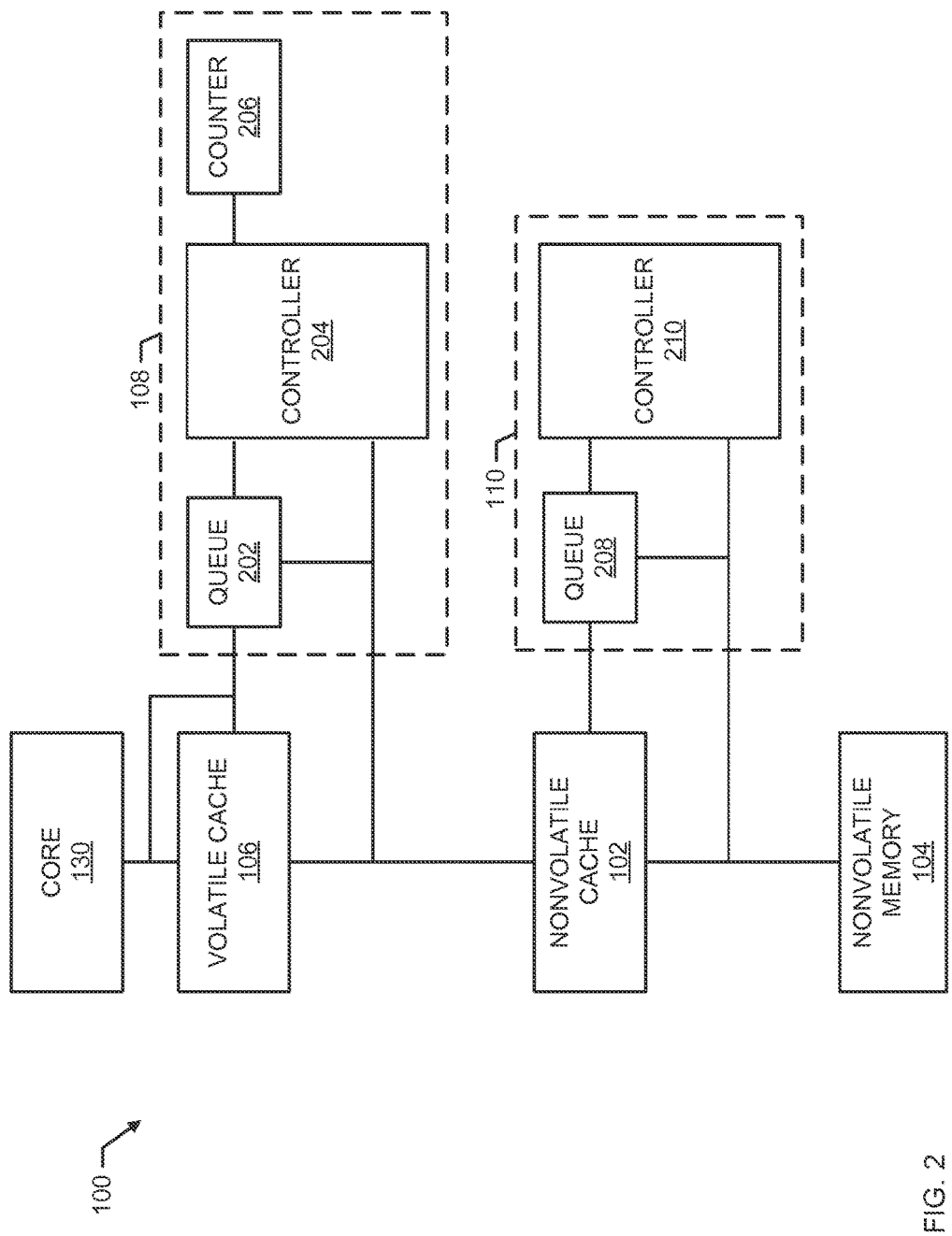
FIG. 2 illustrates example configurations of the example volatile cache transaction manager and the example nonvolatile cache transaction manager of FIGS. 1A and 1B.

FIG. 2 illustrates example configurations of the example volatile cache transaction manager 108 and the example nonvolatile cache transaction manager 110 of FIGS. 1A and 1B. In the illustrated example, the example volatile cache transaction manager 108 and the example nonvolatile cache transaction manager 110 manage transactions and memory updates for data at the example volatile cache 106 and the example nonvolatile cache 102. The example volatile cache transaction manager 108 of the illustrated example includes an example queue 202, an example controller 204, and an example counter 206. The example nonvolatile cache transaction manager 110 of the illustrated example includes an example queue 208 and an example controller 210.

Figure 4:
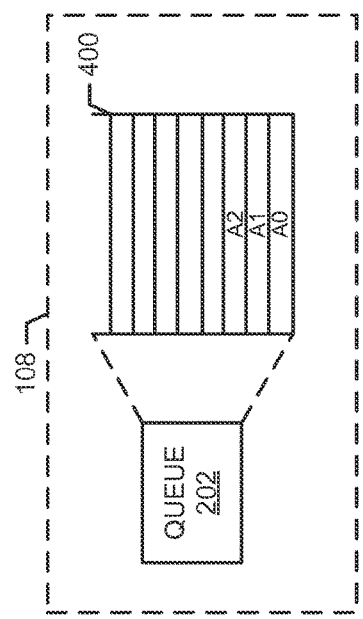
FIG. 4 illustrates an example queue of FIG. 2 during the transaction of FIG. 3.

In the illustrated example, the example queue 202 and the example queue 208 are used to track cached data (e.g., dirty data) associated with transactions (e.g., transactions performed by the example core 130). To track data associated with the transactions, the example queue 202 and the example queue 208 store addresses of the data cached at the volatile cache 106 or the nonvolatile cache 102. In some examples, the queue 202 and the queue 208 are implemented using a first in, first out (FIFO) storage. In some examples, the example queue 202 and/or the example queue 208 include(s) information similar to that stored in the example volatile cache 106 and the example nonvolatile cache 102, respectively. That is, the queue 202 and/or the queue 208 may include a core identifier (e.g., similar to the core identifier (CID) fields 122 and 138 of FIG. 1B), a hardware thread identifier (e.g., similar to the hardware thread identifier (HTID) fields 124 and 140 of FIG. 1B), and/or a transaction identifier (e.g., similar to the transaction identifier (TxID) fields 126 and 142 of FIG. 1B). In some examples, the example queue 202 and/or the example queue 208 store copies of data (e.g., copies of data stored in the data field 116 and 134 of FIG. 1B). Such information and/or data is obtained from the volatile cache 106 and/or the nonvolatile cache 102, and/or is determined by the example volatile cache transaction manager 108 and/or the example nonvolatile cache transaction manager 110. In the illustrated example, the queue 202 and the queue 208 are implemented using volatile memory and, thus, information stored in the queue 202 and the queue 208 will be lost if the system 100 loses power. However, in other examples, the queues 202 and 208 may be implemented using nonvolatile memory. An example implementation of the queue 202 is illustrated in FIG. 4.

The example controller 204 uses the information in the example queue 202 to determine when to implement an operation (e.g., a clean-on-commit operation) to cause the example volatile cache 106 to write back data associated with transactions from the volatile cache 106 to the example nonvolatile cache 102. The example controller 210 uses the information in the example queue 208 to determine when to cause the example nonvolatile cache 102 to write back data associated with transactions from the nonvolatile cache 102 to the example nonvolatile memory 104.

In the illustrated example, when a new transaction begins, the example core 130 sends a transaction begin signal (e.g., Tx_begin) to the example volatile cache transaction manager 108. Based on the transaction begin signal, the example controller 204 updates the example transaction counter 206 (e.g., increments the counter 206) and allocates a new transaction identifier to the data (e.g., the data associated with the transaction) to be stored at the example volatile cache 106. The controller 204 stores the transaction identifier at the transaction identifier (TxID) field 126 (FIG. 1B) of the example volatile cache 106 when the data associated with the transaction is cached at the volatile cache 106.

In the illustrated example, the example controller 204 determines when the transaction is executing (e.g., when the transaction is a committing transaction). As the transaction is executing (e.g., performing particular operations), the controller 204 stores addresses of the data associated with the operations being performed at the volatile cache 106 in the example queue 202. As the operations are completed (e.g., while the transaction is executing), the example controller 204 of the illustrated example instructs the example volatile cache 106 to write back data associated with the completed operations from the volatile cache 106 to the example nonvolatile cache 102. In some examples, the controller 204 uses the addresses of the data stored at the queue 202 to inform the example volatile cache 106 of the data to be written back to the example nonvolatile cache 102.

When the transaction ends (e.g., the transaction is a committed transaction), the example core 130 sends a transaction end signal (e.g., Tx_end) to the example volatile cache transaction manager 108. In some examples, the volatile cache transaction manager 108 informs the example nonvolatile cache transaction manager 110 when the transaction has ended. If another new transaction begins, the example core 130 sends another transaction begin signal to the example volatile cache transaction manager 108, and the example controller 204 updates (e.g., increments) the transaction counter 206 and allocates another new transaction identifier to the data (e.g., the data associated with the new transaction) to be stored at the example volatile cache 106.

In the illustrated example, as data associated with a transaction is written back from the example volatile cache 106 to the example nonvolatile cache 102, the controller 210 stores addresses of the data associated with the transaction in the example queue 208. The controller 210 of the illustrated example determines if all data associated with the transaction has been written back from the example volatile cache 106 to the example nonvolatile cache 102. If all data associated with the transaction has been written back and the transaction is done executing (e.g., the transaction is a committed transaction), the example controller 210 updates the status of the data to durable. To update the status of the data to durable, the example controller 210 updates the committing state (C) field 136 (FIG. 1B) of the example nonvolatile cache 102 to one (1). In some examples, data is evicted from the example nonvolatile cache 102 to the example nonvolatile memory 104 as part of a dirty line eviction process. In some examples, once the committing state (C) field 136 is set to durable, the example controller 210 instructs the example nonvolatile cache 102 to write back the durable data to the example nonvolatile memory 104. In some examples, the controller 210 uses the addresses of the data stored in the queue 208 to inform the example nonvolatile cache 102 of the data to be written back to the example nonvolatile memory 104.

While an example manner of implementing the example volatile cache transaction manager 108 and the example nonvolatile cache transaction manager 110 of FIGS. 1A and 1B is illustrated in FIG. 2, one or more of the elements, processes and/or devices illustrated in FIG. 2 may be combined, divided, re-arranged, omitted, eliminated and/or implemented in any other way. Further, the example queue 202, the example controller 204, the example counter 206, the example queue 208, the example controller 210, and/or, more generally, the example volatile cache transaction manager 108 and/or the example nonvolatile cache transaction manager 110 of FIG. 2 may be implemented by hardware, software, firmware and/or any combination of hardware, software and/or firmware. Thus, for example, any of the example queue 202, the example controller 204, the example counter 206, the example queue 208, the example controller 210, and/or, more generally, the example volatile cache transaction manager 108 and/or the example nonvolatile cache transaction manager 110 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example, queue 202, the example controller 204, the example counter 206, the example queue 208, and/or the example controller 210 are hereby expressly defined to include a tangible computer readable storage device or storage disc such as a memory, DVD, CD, Blu-ray, etc. storing the software and/or firmware. Further still, the example volatile cache transaction manager 108 and/or the example nonvolatile cache transaction manager 110 of FIG. 2 may include one or more elements, processes and/or devices in addition to, or instead of, those illustrated in FIG. 2, and/or may include more than one of any or all of the illustrated elements, processes and devices.

Figure 3:
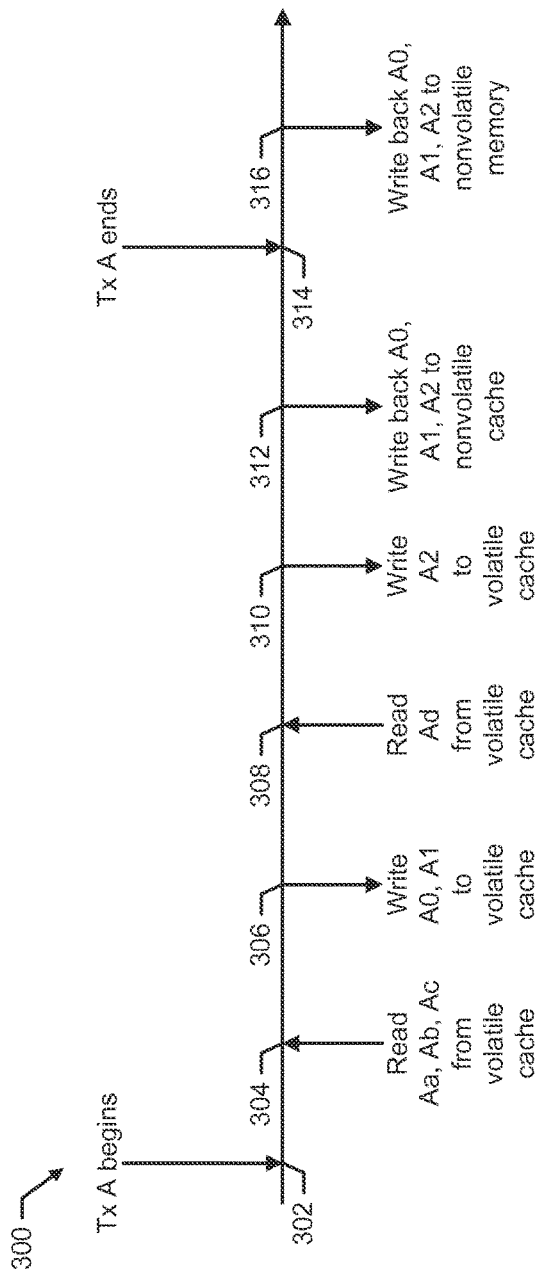
FIG. 3 illustrates an example timing diagram for a transaction executed by the example processor system of FIGS. 1A and 1B.

FIG. 3 illustrates an example timing diagram 300 for a transaction executed by the example processor system 100 of FIGS. 1A and 1B. In the illustrated example, at time 302, the core 130 (FIGS. 1B and 2) initiates a transaction A (Tx A) and transaction A begins. At time 304, data stored at addresses Aa, Ab, and Ac are read from the example volatile cache 106. In this manner, the core 130 can modify or update the data. At time 306, updated data based on the previous data originally stored at address Aa is written to the example volatile cache 106 at address A0. Also at time 306, updated data based on the previous data originally stored at address Ab is written to the example volatile cache 106 at address A1. At time 308, data stored at address Ad is read from the example volatile cache 106. In this manner, the core 130 can modify or update the data. At time 310, updated data based on the previous data originally stored at address Ac is written to the example volatile cache 106 at address A2. In some examples, address Aa is address A0, address Ab is address A1, and address Ac is address A2. In such examples, the core 130 overwrites the original data with the updated data in the volatile cache 106.

At time 312, the example volatile cache transaction manager 108 causes the example volatile cache 106 to write back data stored at addresses A0, A1, and A2 to the example nonvolatile cache 102. As shown in FIG. 3, data may be written back from the example volatile cache 106 to the example nonvolatile cache 102 as the transaction A (TxA) of FIG. 3 is still being executed (e.g., the transaction A is in a committing transaction state before the transaction A has ended). In some examples, the core 130 may begin another transaction to update data in the volatile cache 106 before all data associated with transaction A of FIG. 3 is written back to the example nonvolatile cache 102. In some examples, A0, A1, and A2 are written back to the example nonvolatile cache 102 in the order that they were read from and written to the example volatile cache 106. In some examples, A0, A1, and A2 may be written back to the example nonvolatile cache 102 in a different order than the order in which they were read from and written to (e.g., updated in) the example volatile cache 106 (e.g., they may be written back to the nonvolatile cache 102 out of order or out-of-sequence).

Once the data stored at addresses A0, A1, and A2 is written back to the example nonvolatile cache 102, the data is persistent. At time 314, transaction A ends. In the illustrated example, the data stored at address Ad in the example volatile cache 106 is not dirty (e.g., is not updated) and, thus, an updated version is not written back to the example volatile cache 106. At time 316, because all data associated with transaction A is stored at the example nonvolatile cache 102 and transaction A has ended, the example nonvolatile cache transaction manager 110 updates the status of the data to durable. In some examples, at time 316, the example nonvolatile cache transaction manager 110 instructs the example nonvolatile cache 102 to write back the data to the example nonvolatile memory 104. In some examples, at time 316, data is evicted from the example nonvolatile cache 102 to the example nonvolatile memory 104 as part of a dirty line eviction process. The example volatile cache transaction manager 108 may inform the example nonvolatile cache transaction manager 110 when transaction A has ended.

FIG. 4 illustrates an example implementation of the queue 202 of FIG. 2 during the transaction illustrated in connection with FIG. 3. In the example of FIG. 4, the queue 202 is implemented using a first in, first out (FIFO) storage arrangement 400. When updated data is written to the example volatile cache 106 (FIG. 2) at addresses A0 and A1 at time 306 (FIG. 3), addresses A0 and A1 are written into the FIFO 400. When updated data is written to the example volatile cache 106 at address A2 at time 310, address A2 is written into the FIFO 400. The example volatile cache transaction manager 108 (FIG. 2) uses the FIFO 400 to determine when to instruct the example volatile cache 106 to write back data to the example nonvolatile cache 102. For example, at time 312, the example volatile cache transaction manager 108 determines that the data at addresses A0, A1, and A2 has been successfully updated, and instructs the example volatile cache 106 to write back the updated data stored at address A0, then the updated data stored at address A1, then the updated data stored at address A2. In the example of FIG. 4, because address A0 was the first address stored in the FIFO 400, A0 is the first address to be processed from the FIFO 400 and the first address to be identified by the example volatile cache transaction manager 108 to be written back to the nonvolatile memory 102.

Figure 5:
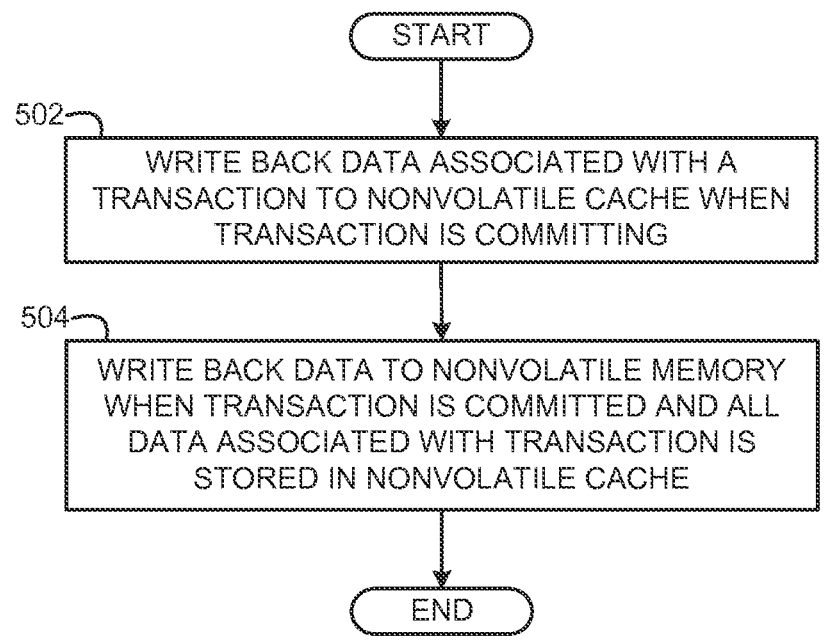
FIG. 5 is a flow diagram representative of an example process that may be performed by logic or example machine readable instructions to store data in the nonvolatile cache and the nonvolatile memory of FIGS. 1A, 1B, and 2 using the example persistent memory architecture of FIGS. 1A, 1B, and 2.
Figure 6:
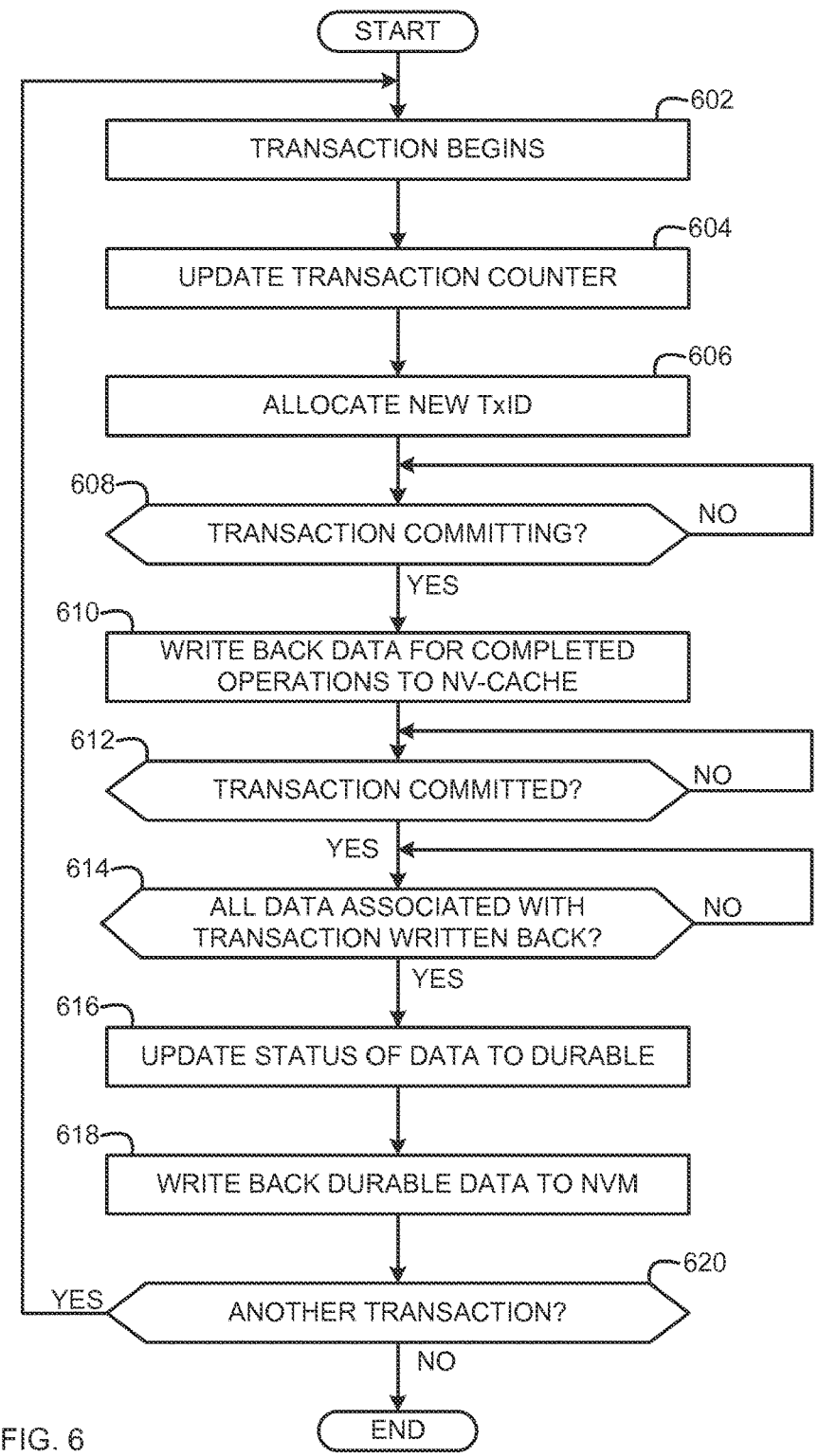
FIG. 6 is a flow diagram representative of an example process that may be performed by logic or example machine readable instructions to perform persistent memory updates.
Figure 7:
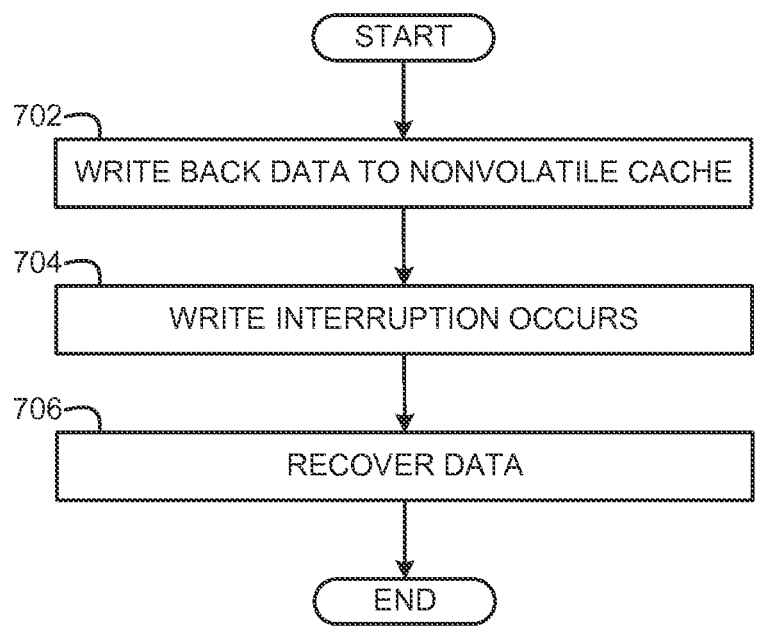
FIG. 7 is a flow diagram representative of an example process that may be performed by logic or example machine readable instructions to perform system recovery.

Flowcharts representative of example machine readable instructions for implementing the example volatile cache transaction manager 108 and the example nonvolatile cache transaction manager 110 are shown in FIGS. 5, 6, and 7. In this example, the machine readable instructions comprise a program for execution by a processor (e.g., the processor 128 of FIG. 1B). The program may be embodied in software stored on a tangible computer readable storage medium such as a CD-ROM, a floppy disk, a hard drive, a digital versatile disk (DVD), a Blu-ray disk, or a memory associated with the processor, but the entire program and/or parts thereof could alternatively be executed by a device other than the processor and/or embodied in firmware or dedicated hardware. Further, although the example program is described with reference to the flowcharts illustrated in FIGS. 5, 6, and 7, many other methods of implementing the example volatile cache transaction manager 108 and the example nonvolatile cache transaction manager 110 may alternatively be used. For example, the order of execution of the blocks may be changed, and/or some of the blocks described may be changed, eliminated, or combined.

As mentioned above, the example processes of FIGS. 5, 6, and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 5, 6, and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

FIG. 5 is a flow diagram representative of example machine readable instructions that may be executed to store data in the nonvolatile cache 102 and the nonvolatile memory 104 of FIGS. 1A, 1B, and 2 using the example persistent memory architecture 101 of FIGS. 1A, 1B, and 2.

In the illustrated example, the example volatile cache transaction manager 108 (FIGS. 1A, 1B, 2) instructs the volatile cache 106 (FIGS. 1A, 1B, 2) to write back data associated with a transaction to the example nonvolatile cache 102 when the transaction is committing (e.g., the transaction is executing) (block 502). Once the data is written to the example nonvolatile cache 102, the data is persistent. Once all data associated with the committing transaction is written to the example nonvolatile cache 102, and the transaction becomes a committed transaction (e.g., the transaction is done executing), the data is durable and is available for retrieval after recovery from a system or power failure. In the illustrated example, the example nonvolatile cache transaction manager 110 (FIGS. 1A, 1B, 2) instructs the example nonvolatile cache 102 to write back the data to the example nonvolatile memory 104 when the transaction is committed and all data associated with the transaction is stored in the example nonvolatile cache 102 (block 504). In some examples, data may be evicted from the example nonvolatile cache 102 to the example nonvolatile memory 104 as part of a dirty line eviction process. The example process of FIG. 5 then ends.

FIG. 6 is a flow diagram representative of example machine readable instructions that may be executed to perform persistent memory updates at the persistent memory architecture 101 of FIGS. 1A, 1B, and 2. In the illustrated example, a new transaction begins (block 602). For example, the example core 130 (FIGS. 1B and 2) sends a transaction begin signal (e.g., Tx_begin) to the example volatile cache transaction manager 108 (FIGS. 1A, 1B, 2). Based on the transaction begin signal, the example controller 204 (FIG. 2) updates the example transaction counter 206 (FIG. 2) (e.g., increments the counter 206) (block 604). The example controller 204 allocates a new transaction identifier to the data (e.g., the data associated with the transaction) to be stored at the example volatile cache 106 (FIGS. 1A, 1B, 2) (block 606). For example, the controller 204 stores the transaction identifier at the transaction identifier (TxID) field 126 (FIG. 1B) of the example volatile cache 106 when the data associated with the transaction is cached at the volatile cache 106.

In the illustrated example, the example controller 204 determines when the transaction is executing (e.g., when the transaction is a committing transaction) (block 608). Control remains at block 608 until the transaction is a committing transaction. As the transaction is executing (e.g., performing particular operations corresponding to the transaction), the controller 204 stores addresses of the data associated with the operations being performed at the volatile cache 106 in the example queue 202 (FIG. 2). As the operations are completed (e.g., while the transaction is executing), the example controller 204 of the illustrated example instructs the example volatile cache 106 to write back data associated with the completed operations from the volatile cache 106 to the example nonvolatile cache 102 (FIGS. 1A, 1B, 2) (block 610). In some examples, the controller 204 uses the addresses of the data stored at the queue 202 to inform the example volatile cache 106 of the data to be written back to the example nonvolatile cache 102. In the illustrated example, as data associated with a transaction is written back from the example volatile cache 106 to the example nonvolatile cache 102, the controller 210 (FIG. 2) stores addresses of the data associated with the transaction in the example queue 208 (FIG. 2).

When the transaction ends (e.g., the transaction is a committed transaction) (block 612), the example core 130 sends a transaction end signal (e.g., Tx_end) to the example volatile cache transaction manager 108. Control remains at block 612 until the transaction is a committed transaction. In some examples, the volatile cache transaction manager 108 informs the example nonvolatile cache transaction manager 110 when the transaction has ended.

The controller 210 of the illustrated example determines if all data associated with the transaction has been written back from the example volatile cache 106 to the example nonvolatile cache 102 (block 614). Control remains at block 614 until all data associated with the transaction has been written back to the example nonvolatile cache 102. If all data associated with the transaction has been written back to the example nonvolatile cache 102 (block 614), the example controller 210 updates the status of the data to durable (block 616). To update the status of the data to durable, the example controller 210 updates the committing state (C) field 136 (FIG. 1B) of the example nonvolatile cache 102 to one (1). In the illustrated example, once the committing state (C) field 136 is set to durable, the example controller 210 instructs the example nonvolatile cache 102 to write back the durable data to the example nonvolatile memory 104 (block 618). In some examples, the controller 210 uses the addresses of the data stored in the queue 208 to inform the example nonvolatile cache 102 of the data to be written back to the example nonvolatile memory 104. In some examples, data is evicted from the example nonvolatile cache 102 to the example nonvolatile memory 104 as part of a dirty line eviction process.

If another new transaction begins (block 620), control returns to block 602 and the example core 130 sends another transaction begin signal to the example volatile cache transaction manager 108. If another new transaction does not begin (block 620), the example process of FIG. 6 ends.

FIG. 7 is a flow diagram representative of example machine readable instructions that may be executed to perform data recovery in the example system 100 of FIGS. 1A, 1B and/or 2. In the illustrated example, the example volatile cache transaction manager 108 (FIGS. 1A, 1B, 2) instructs the example volatile cache 106 (FIGS. 1A, 1B, 2) to write back data to the example nonvolatile cache 102 (block 702) using, for example, a transaction. The data may be written back from the example volatile cache 106 to the example nonvolatile cache 102 using, for example, the process described above in connection with FIG. 6. In the illustrated example, as data is being written back from the example volatile cache 106 to the example nonvolatile cache 102, a write interruption occurs (block 704). A write interruption may include, for example, an application failure, a program failure, a system crash, a power failure, etc. In the illustrated example, the write interruption causes the write back of block 702 to not complete and, thus, to not finish writing back all the data associated with the transaction of block 702 to the nonvolatile cache 102.

In the illustrated example, after a write interruption occurs, the example nonvolatile cache transaction manager 110 performs a data recovery operation (block 706). That is, the example nonvolatile cache transaction manager 110 recovers data associated with the write that was interrupted at block 704. For example, the example nonvolatile cache transaction manager 110 scans the example nonvolatile cache 102 and invalidates data associated with uncommitted transactions (e.g., data that is not durable). In some examples, a separate controller and/or manager may be provided to implement the system recovery. A previous version of the data stored at the example nonvolatile cache 102 that has been marked as durable by the example nonvolatile cache transaction manager 110 and/or a previous version of the data that has been stored in the example nonvolatile memory 104 (FIGS. 1A, 1B, 2) may be used directly to replace invalidated data at the example nonvolatile cache 102 when the example system 100 reboots. The example process of FIG. 7 then ends.

Although certain methods, apparatus, systems, and/or articles of manufacture have been disclosed herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A system to provide persistent memory, comprising:
a nonvolatile cache to store data received from a volatile cache and to support atomicity, consistency and durability, the data being associated with a transaction, the data to be identified as durable when the transaction is a committed transaction;
a nonvolatile memory to store the data received from the nonvolatile cache when the data is identified as durable; and
a volatile cache manager to write back the data from the volatile cache to the nonvolatile cache when the transaction is executing,
wherein data persistence is maintained without a log.

2. The system of claim 1, wherein the nonvolatile cache stores a first previous version of the data and the nonvolatile memory stores a second previous version of the data.

3. The system of claim 2, further comprising a nonvolatile cache transaction manager to perform a data recovery operation to recover the first previous version of the data from the nonvolatile cache or the second previous version from the nonvolatile memory after a write interruption interrupts a write back of the data from the volatile cache to the nonvolatile cache.

4. The system of claim 1, wherein the data is written back from the volatile cache to the nonvolatile cache in a different order than the order in which it was updated in the volatile cache.

5. The system of claim 1, wherein the transaction is a set of operations to update the data and the transaction is a committed transaction when the set of operations are executed.

6. The system of claim 1, further comprising a nonvolatile cache transaction manager to update a tag field of the nonvolatile cache to indicate if the data is durable.

7. The system of claim 6, wherein the nonvolatile cache transaction manager determines the data is durable if the data associated with the transaction is stored in the nonvolatile cache.

8. The system of claim 1, further comprising a nonvolatile cache transaction manager to determine that the nonvolatile cache is to write the data to the nonvolatile memory when all the data associated with the transaction is stored in the nonvolatile cache and the transaction is a committed transaction.

9. The system of claim 1, wherein the nonvolatile cache is collocated with the nonvolatile memory or is located in a processor.

10. A method to provide persistent memory, comprising:
storing first data received from a volatile cache at a nonvolatile cache, the first data to be identified as durable when a transaction associated with the first data becomes a committed transaction and the data is persistent, the nonvolatile cache to support atomicity, consistency and durability;
evicting the first data from the nonvolatile cache responsive to identifying the first data as durable;
storing the first data received from the nonvolatile cache at a nonvolatile memory when the data is identified as durable;
writing back the first data from the volatile cache to the nonvolatile cache when the transaction is executing; and
storing second data received from the volatile cache at the nonvolatile cache, the second data being a version of the first data,
wherein data persistence is maintained without a log.

11. The method of claim 10, further comprising performing a data recovery operation to recover the first data from the nonvolatile cache or the nonvolatile memory after a write interruption interrupts a write back of the second data from the volatile cache to the nonvolatile cache.

12. The method of claim 10, wherein the first data is written back from the volatile cache to the nonvolatile cache in a different order than the order in which it was updated in the volatile cache.

13. The method of claim 10, wherein the transaction is a set of operations to update the first data and the transaction is a committed transaction when the set of operations are executed.

14. The method of claim 10, wherein the nonvolatile cache is to receive the data from the volatile cache when the transaction is a committing transaction, the transaction being a committing transaction when an operation of a set of operations is executing.

15. The method of claim 10, wherein the nonvolatile cache is to write the first data to the nonvolatile memory when a tag field of the nonvolatile cache indicates the first data is durable.

* * * * *